(12) United States Patent
Singhal

(10) Patent No.: US 8,831,301 B2
(45) Date of Patent: Sep. 9, 2014

(54) IDENTIFYING IMAGE ABNORMALITIES USING AN APPEARANCE MODEL

(75) Inventor: Amit Singhal, Pittsford, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 746 days.

(21) Appl. No.: 12/567,335

(22) Filed: Sep. 25, 2009

(65) Prior Publication Data

US 2011/0075938 A1   Mar. 31, 2011

(51) Int. Cl.
*G06K 9/62* (2006.01)
(52) U.S. Cl.
USPC .......................................... 382/128; 382/224
(58) Field of Classification Search
CPC ....... G06T 7/0012; G06T 5/50; G06T 7/0089; G06T 2207/30004; G06T 2207/30061
USPC ......................................................... 382/128
See application file for complete search history.

(56) References Cited

U.S. PATENT DOCUMENTS

| | | | |
|---|---|---|---|
| 7,103,224 B2 | 9/2006 | Ashton | 382/224 |
| 2004/0264755 A1* | 12/2004 | Sakaida | 382/128 |
| 2005/0169536 A1* | 8/2005 | Accomazzi et al. | 382/228 |
| 2008/0002870 A1* | 1/2008 | Farag et al. | 382/128 |

OTHER PUBLICATIONS

Javier Portilla and Eero P. Simoncelli. A Parametric Texture Model Based on Joint Statistics of Complex Wavelet Coefficients. International Journal of Computer Vision 40(1), 49-71, 2000.
Tianli Yu, Jiebo Luo, and Narendra Ahuja. Search Strategies for Shape Regularized Active Contour. Computer Vision and Image Understanding, 2008.
T. F. Cootes, G. J. Edwards, and C. J. Taylor. Active Appearance Models. Proc. European Conference on Computer Vision 1998 (H. Burkhardt and B. Neumann Eds.). vol. 2, pp. 484-498, Springer, 1998.
Ying Dai and Yasuaki Nakano, "Face-texture model based on SGLD and its application in face detection in a color scene", Pattern Recognition 29(6), 1996, pp. 1007-1017.

* cited by examiner

*Primary Examiner* — Hiep V Nguyen

(57) ABSTRACT

The identification of known normal structures within an image is preferably accomplished using an appearance model. Specifically, an active appearance model, which encapsulates a complete model of the shape and global texture variations of an object from a collection of samples, is utilized to define normal structures within an image by restricting training samples supplied to the active appearance model during a training phase to those that do not contain abnormal structures. Accordingly, the trained appearance model represents only normal variations in the object of interest. When another image with abnormalities is presented to the system, the appearance model cannot synthesize the abnormal structures which show up as errors in a residual image. Accordingly, the errors in the residual image represent potential abnormalities.

17 Claims, 3 Drawing Sheets

IDENTIFYING IMAGE ABNORMALITIES USING AN APPEARANCE MODEL

FIELD OF THE INVENTION

The invention is directed to a method and apparatus for identifying abnormalities or anomalies within images. In particular, the invention is directed to a method and apparatus that utilizes an appearance model to identify abnormalities or anomalies within images.

BACKGROUND OF THE INVENTION

Identification of abnormalities or anomalies in images is particularly useful in the field of medicine to diagnose a number of potentially serious and deadly medical conditions. The identification of abnormalities in medical images, such as conventional X-rays, magnetic resonance imaging (MRI) scans and computer tomography (CT) scans, initially relied upon the talents of a skilled clinician to view an image and manually identify the abnormalities within the image. As even the most advanced imaging technologies have become more readily available and affordable, however, the number of images generated for medical diagnostic purposes has increased dramatically over the years. It soon became apparent that automated methods and systems would have to be developed in order to decrease the amount of time required for a clinician to review an individual image. By prescreening images using automated methods and systems, a skilled clinician can review more images within a given time frame, which results in greater efficiency and an overall reduction in the expensive of reading and interpreting medical images.

In view of the above, efforts have been made in the field of medical imaging technology to develop automated systems capable of imaging a particular area of the body and detecting potential abnormalities within the imaged area. For example, U.S. Pat. No. 7,103,224; entitled: "Method and System for Automatic Identification and Quantification of Abnormal Anatomical Structures in Medical Images", by Edward Ashton; discloses a system that detects structures that are similar to an exemplar structure in order to detect lesions in images scans. In any such automated system, it is preferably to have identified abnormalities highlighted or otherwise visually indicated to allow a skilled clinician to quickly focus on areas of potential interest within an image. The skilled clinician can then identify whether the potential abnormality is significant and related to a potentially harmful medical condition or whether the potential abnormality is not significant and can be dismissed without further study. Thus, a great deal of the skilled clinician's time can be saved, even if the automated system does not positively identify abnormalities as harmful conditions, by quickly directing the clinician to those areas of the image most likely to contain abnormalities requiring the clinician's attention.

In conventional imaging systems in which abnormalities are identified, the systems have generally focused on utilizing processes and techniques that identify structures associated with specific types of abnormalities such as tumors or lesions. Image processing techniques employed in conventional MRI's, for example, are often focused on identifying the specific morphology of tumors or other abnormal anatomical features within an image. Attempting to identify a structure of tumor, however, can be extremely difficult due to the wide range and variation in the morphology of tumors, making it difficult to create a robust system capable of detecting a wide range of abnormalities. Thus, automated systems based on identification and separation of abnormal structures from known normal structures tend to be complex in nature, as a great deal of effort must be made to model and define what an abnormal structure is compared with a normal structure.

In view of the above, it would be desirable to provide a method and apparatus for identifying abnormalities within images that does not rely upon the identification of the structure of the abnormality itself.

SUMMARY OF THE INVENTION

A method and apparatus for identifying abnormalities within images is provided that does not reply upon the identification of the structure of the abnormality itself. Put simply, instead of attempting to detect the specific structure of the abnormality within an image, the present invention identifies normal structures within the image and characterizes areas that cannot be identified as normal as potential abnormalities. The identification of normal structures can be accomplished in a much less complicated manner than attempting to identify the specific structure of an abnormality.

The identification of known normal structures within an image is preferably accomplished by using an appearance model. Specifically, an active appearance model, which encapsulates a complete model of the shape and global texture variations of an object from a collection of samples, is utilized to define normal structures within an image by restricting training samples supplied to the active appearance model during a training phase to those that do not contain abnormal structures. Accordingly, the trained appearance model represents only normal variations in the object of interest. When another image with abnormalities is presented to the system, the appearance model cannot synthesize the abnormal structures which show up as errors in a residual image. Accordingly, the errors in the residual image represent potential abnormalities. Thus, the present invention identifies the normal structures within an image such that any unidentified structures are considered to be abnormalities which can then be reviewed in greater detail.

In a preferred embodiment, a method of detecting abnormalities in an image is provided that includes supplying the image of the object to an image abnormality processing unit using a data entry interface device, synthesizing a sample normal image of the object based on an appearance model utilizing the image abnormality processing unit; and identifying abnormalities in the input image based at least upon an analysis of differences between the image of the object and the sample normal image of the object. The appearance model is preferably generated based on a set of training images. Preferably, a shape model and/or a texture model is applied to the set of training images to generate the appearance model.

The method is preferably performed by an image abnormality identification system that includes a memory unit that stores an appearance model corresponding to a normal appearance of an object of interest, a data entry interface device for entering an input image of an object of interest, and an image abnormality processing unit that synthesizes a sample normal image of the object of interest based on the appearance model stored in the memory unit, and identifies abnormalities in the input image based at least upon an analysis of differences between the input image and the sample normal image of the object.

Other features, advantages, modifications, embodiments, etc., will become apparent to those skilled in the art from the following detailed description of the preferred embodiments of the invention and the accompanying drawings.

BRIEF DESCRIPTION OF THE DRAWINGS

The invention will be described in detail with reference to certain preferred embodiments thereof and the accompany drawings, wherein.

DETAILED DESCRIPTION OF THE INVENTION

Figure 1:
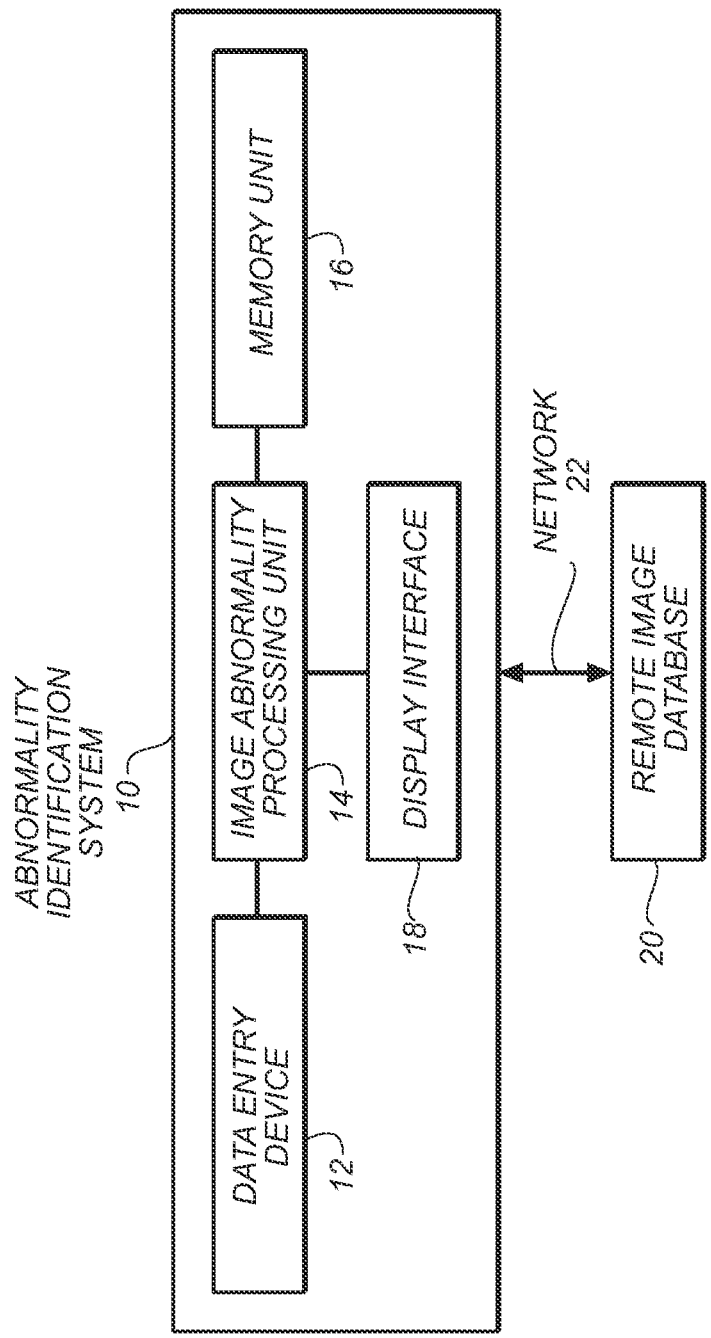
FIG. 1 is a schematic block diagram of an abnormality identification system in accordance with the claimed invention.

FIG. 1 is a schematic block diagram of an abnormality identification system 10 in accordance with the claimed invention. The abnormality identification system 10 preferably includes a data entry device 12 through which data is entered into the system, an image abnormality processing unit 14 that processes data received from the data entry device 12, a memory unit 16 that stores data and/or executable instructions for the image abnormality processing unit 14, and a display interface 18 that displays results to a user of the system. The data entry device 12 includes any desired type or combination of types of data entry devices, for example, magnetic media interface devices, optical media interface devices, hard-wired communication ports, wireless communication ports, etc., to permit data to be received and entered into the abnormality identification system 10. The image abnormality processing unit 14 includes any desired type or combination of types of data processing devices, for example, application specific programmable devices, general purpose programmable processors, discrete hardware components, firmware, etc., necessary to perform the functions of the image abnormality processing unit 14. The memory unit 16 includes any desired type or combination of types of memory devices for storing digital data, for example, magnetic and/or optical media drives or memory cards, semiconductor memory devices, etc., capable of performing the functions required of the memory unit 16. Further, while elements of the abnormality identification system 10 are shown separately for purposes of illustration, the various components of the system may be combined in one or more physical devices.

Figure 2:
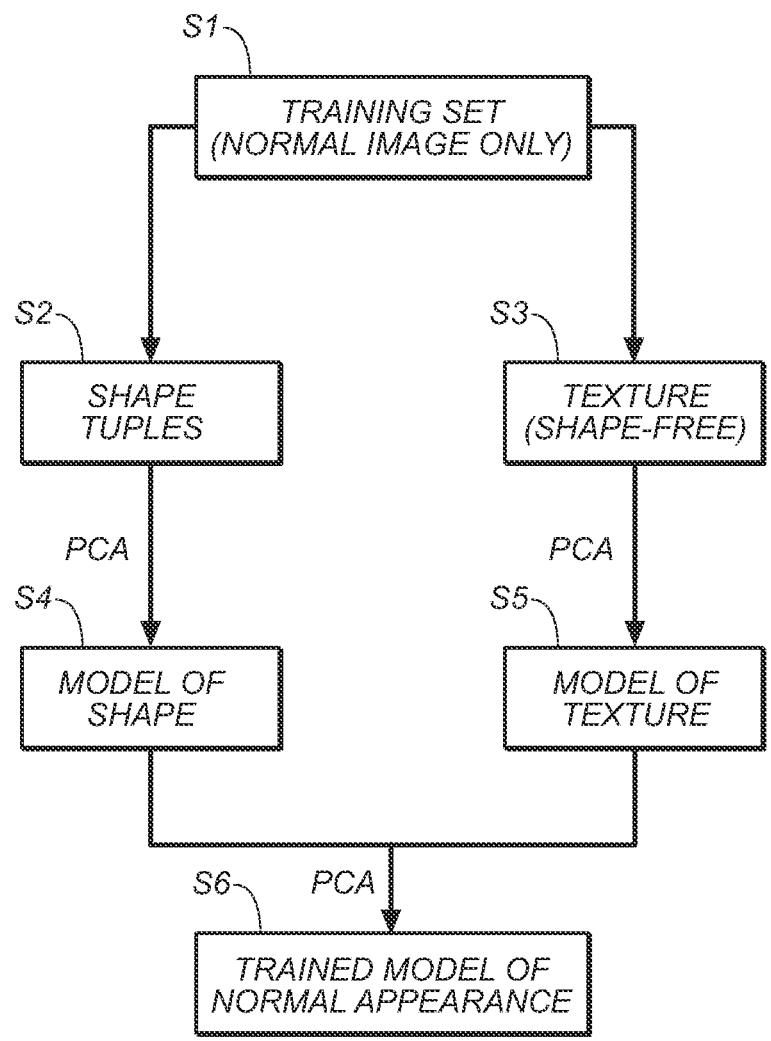
FIG. 2 is a flow diagram illustrating a training phase used to train the abnormality identification system illustrated in FIG. 1.

Prior to being able to process images for abnormality identification, the abnormality identification system 10 is first put through a training phase in order to generate a trained model of normal appearance as illustrated in FIG. 2. The training phase requires that a training set of normal images, which, in some embodiments, correspond to an evaluation object belonging to a predetermined class, be supplied to the image abnormality processing unit 14. Depending upon the specific application, the training set of normal images may be stored in a remote image database 20 that can be accessed via a network 22 or may be stored on a portable storage medium. If the training set of normal images is stored in the remote image database 20, the data entry device 12 connects to the remote image database 20 via the network 22 and downloads the training set of normal images to the abnormality identification system 10. If the training set of normal images is contained on a portable storage medium, the portable storage medium is inserted into and read by the data entry device 12. In either case, the training images are processed by the image abnormality processing unit 14, either in real time as received by the data entry device 12 or after being downloaded to the memory unit 16 for later processing, to produce a trained model of normal appearance of the object.

In a preferred embodiment, the image abnormality processing unit 14 utilizes both a texture model and a shape model to process the training images contained in the training set, although other types or combination of models may be employed. As will be readily understood by those skilled in the art, the term "model" in the current context refers to a set of executable instructions provided to the image abnormality processing unit 14 in order to perform a specific process. The texture model defines a texture distribution for a group of normal objects contained within the training set of images. The use of a texture model for image processing is well known in the art as discussed, for example, in the article entitled: "*A Parametric Texture Model based on Joint Statistics of Complex Wavelet Coefficients*", by Javier Portilla and Eero P. Simoncelli, International Journal of Computer Vision 40(1), 49-71, 2000; and in the article entitled: "*Face-texture model based on SGLD and its application in face detection in a color scene*", by Ying Dai and Yasuaki Nakano, Pattern Recognition 29(6):1007-1017, 1996; the content of each of which is incorporated herein by reference. The shape model defines a shape distribution for the group of normal objects. The use of shape models for image processing is also well known in the art as discussed in the article entitled: "*Search Strategies for Shape Regularized Active Contour*", by Tianli Yu, Jiebo Luo, and Narendra Ahuja, Computer Vision and Image Understanding, 2008. The result of the application of the texture model and the shape model is a trained model of normal appearance that is stored in the memory unit 16. The use of appearance models in image processing is also well known to those in the art as described, for example, in the article entitled: "*Active Appearance Models*", by T. F. Cootes, G. J. Edwards, and C. J. Taylor, Proc. European Conference on Computer Vision 1998 (H. Burkhardt and B. Neumann, Eds.), Vol. 2, pp. 484-498, Springer, 1998; the content of which is incorporated herein by reference.

In a preferred embodiment, the image abnormality processing unit 14 utilizes the steps shown in FIG. 2 to build a trained model of normal appearance. The image abnormality processing unit 14 receives a set of training images (S1) corresponding to the object class of a desired evaluation object. In some embodiments, a set of shape tuples (S2) is created by extracting the shape contours of the normal objects in the set of training images. Similarly, in some embodiments, a set of texture tuples is created (S3) by extracting the texture information associated with the normal objects in the set of training images. In a preferred embodiment, the set of texture tuples is created by first normalizing the shape contours of the objects in the set of training images to the mean shape contour of all objects in the set of training images. The result is a set of texture tuples that all have the same shape for the object (shape-free texture). In a preferred embodiment, principal component analysis (PCA), a technique well known in the art, is applied separately to the set of shape tuples and the set of texture tuples to create a model of normal shape variation (S4) and to create a normal texture variation (S5) for the desired evaluation object class. As will be readily understood by those skilled in the art, other techniques for creating the model of shape and texture variation may also be used. Finally, in a preferred embodiment, PCA is once again applied jointly to both the shape model and the texture model to create the trained model of normal appearance (S6).

Figure 3:
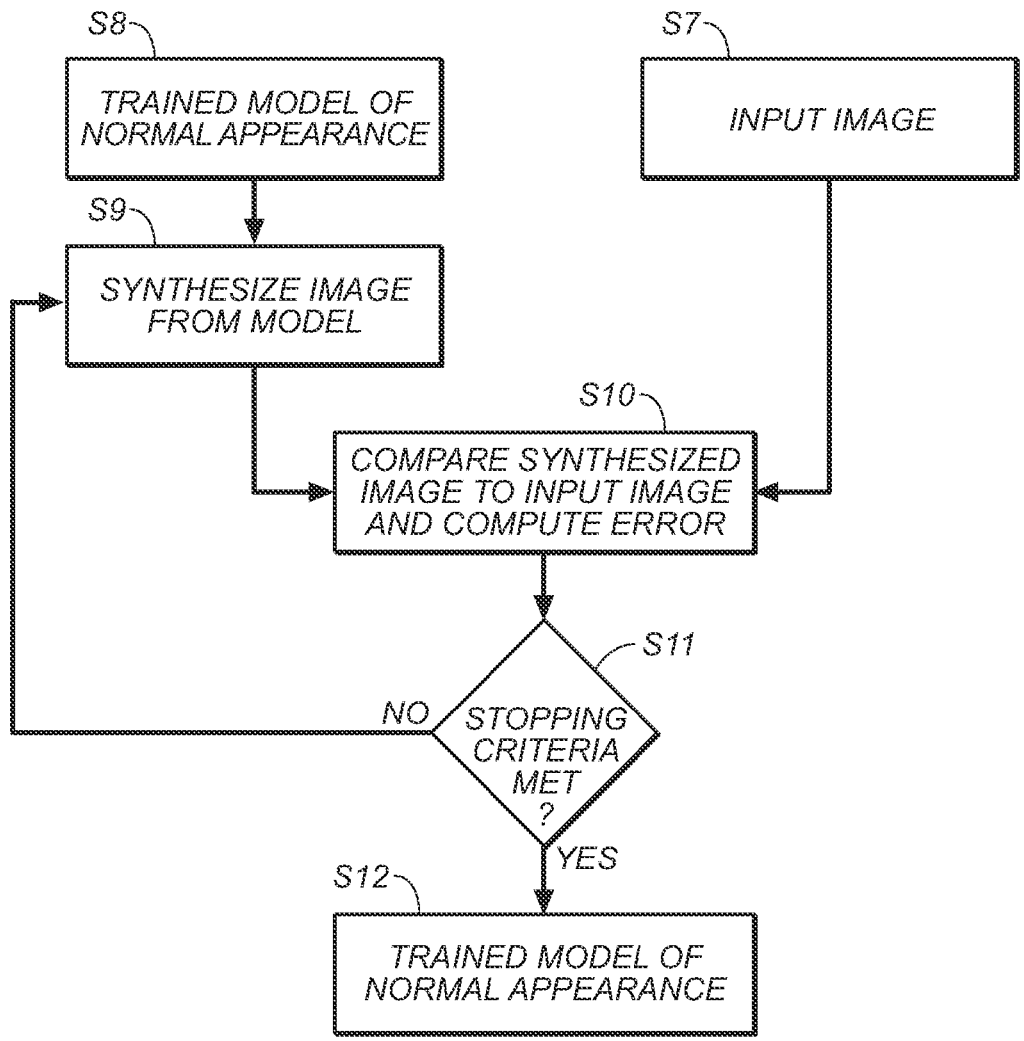
FIG. 3 is a flow diagram illustrating a testing phase performed by the abnormality identification system.

The abnormality identification system 10 is ready to analyze images to identify potential abnormalities once the training phase has been completed and the model of normal appearance has been generated and stored in the memory unit 16. A flow diagram of the testing phase is illustrated in FIG. 3. Images to be analyzed are entered through the data entry device 12 in the same manner as the training set of images. Upon receipt of an input image (S7), the image abnormality processing unit 14 generates a synthesized image (S9) from the trained model of normal appearance retrieved from the memory unit 16 (S8). The synthesized image is then compared to the input image (S10) to identify differences between the two images. A set of stopping criteria is calculated (S11) based on these differences. In a preferred embodiment, the stopping criteria is a threshold on the amount of decrease in the error between two consecutive iterations of the image synthesis process. In another preferred embodiment, the stopping criteria is a threshold on the amount of error between the input image and the synthesized image. If the stopping criteria is not met, the image abnormality processing unit generates a new synthesized image based at least in part upon the differences so that the new error between the newly synthesized image and the original image is lesser than the previous differences. If the stopping criteria is met, then the areas of the input image that do not conform to the synthesized image are identified as areas that contain a potential abnormality. The areas containing the potential abnormalities, namely, the areas that don't correspond to normal areas or the normal object contained in the training set, are identified in a residual image (S12) which can be stored in the memory unit 16 and displayed on the display interface 18. In the case of a medical application, the areas containing potential abnormalities are preferably highlighted so that a skilled clinician can easily identify the areas requiring further review and study.

The invention has been described in detail with particular reference to certain preferred embodiments thereof, but it will be understood that variations and modifications can be effected within the spirit and scope of the invention.

PARTS LIST

10 abnormality identification system
12 data entry device
14 image abnormality processing unit
16 memory unit
18 display interface
20 remote image database
22 network
PCA principal component analysis
S1 training set (normal image only)
S2 shape tuples
S3 texture (shape-free)
S4 model of shape
S5 model of texture
S6 trained model of normal appearance
S7 input image
S8 trained model of normal appearance
S9 synthesize image from model
S10 compare synthesized image to input image and compute error
S11 stopping criteria met?
S12 trained model of normal appearance

What is claimed is:

1. A method of detecting abnormalities in an input image of an object, the method comprising:
   receiving the input image of the object at a processing system;
   receiving, at the processing system, a sample normal image of a normal object formed using an appearance model, wherein the appearance model is synthesized from a training set of normal images that depict normal objects containing no abnormalities, and wherein the appearance model is synthesized using a texture model defining a texture distribution for the normal objects and a shape model defining a shape distribution for the normal objects;
   determining, by the processing system, at least one difference between the input image and the sample normal image;
   modifying, by the processing system, the sample normal image based at least in part on the at least one difference between the input image and the sample normal image;
   ceasing modification of the sample normal image based on a stopping criterion being met, wherein the stopping criteria is calculated based on a threshold decrease in the at least one difference between the input image and the sample normal image between consecutive iterations of the determining the at least one difference and the modifying the sample normal image; and
   identifying, by the processing system, an abnormality in the input image, wherein the abnormality is indicated by an area of the input image that does not conform to a corresponding area of the sample normal image.

2. The method as claimed in claim 1, wherein the appearance model is generated based on a shape model applied to the training set of normal images.

3. The method as claimed in claim 1, wherein the appearance model is generated based on a texture model applied to the training set of normal images.

4. The method as claimed in claim 1, wherein the appearance model is generated based on a shape model and a texture model applied to the training set of normal images.

5. The method as claimed in claim 1, wherein the appearance model is an active appearance model.

6. The method as claimed in claim 1, wherein the normal objects are the same class as the object in the input image.

7. The method as claimed in claim 1, further comprising extracting a plurality of texture tuples from the training set of normal images, wherein the extracting the plurality of texture tuples comprises normalizing shape contours of the objects in the training set of normal images to a mean shape contour of all objects in the training set of normal images, and wherein the plurality of texture tuples all have a same shape for the object.

8. The method as claimed in claim 1, wherein synthesis of the appearance model comprises applying principal component analysis jointly to both the texture model and the shape model.

9. The method as claimed in claim 1, further comprising modifying the sample normal images until the threshold amount of error has been satisfied.

10. An apparatus comprising:
    a memory configured to store a sample normal image of a normal object formed using an appearance model, wherein the appearance model is synthesized from a training set of normal images that depict normal objects containing no abnormalities, and wherein the appearance model is synthesized using a texture model defining a texture distribution for the normal objects and a shape model defining a shape distribution for the normal Objects; and
    an image abnormality processing unit configured to:
    determine at least one difference between an input image and the sample normal image;
    modify the sample normal image based at least in part on the at least one difference between the input image and the sample normal image;

cease modification of the sample normal image based on a stopping criterion being met, wherein the stopping criteria is calculated based on a threshold decrease in the at least one difference between the input image and the sample normal image between consecutive iterations of the determining the at least one difference and the modifying the sample normal image; and identify an abnormality in the input image, wherein the abnormality is indicated by an area of the input image that does not conform to a corresponding area of the sample normal image.

11. The apparatus as claimed in claim 10, wherein the image abnormality processing unit is further configured to generate the appearance model based on a shape model applied to the training set of normal images.

12. The apparatus as claimed in claim 10, wherein the image abnormality processing unit is further configured to generate the appearance model based on a texture model applied to the training set of normal images.

13. The apparatus as claimed in claim 10, wherein the image abnormality processing unit is further configured to generate the appearance model based on a shape model and a texture model applied to the training set of normal images.

14. The apparatus as claimed in claim 10, wherein the appearance model is an active appearance model.

15. The apparatus as claimed in claim 10, further comprising a data entry device configured to receive the input image of the object.

16. A non-transitory computer-readable medium having instructions stored thereon that, upon execution by a computing device, cause the computing device to perform operations comprising:

receiving the input image of the object;

receiving a sample normal image of a normal object formed using an appearance model, wherein the appearance model is synthesized from a training set of normal images that depict normal objects containing no abnormalities, and wherein the appearance model is synthesized using a texture model defining a texture distribution for the normal objects and a shape model defining a shape distribution for the normal objects;

determining at least one difference between the input image and the sample normal image;

modifying the sample normal image based at least in part on the at least one difference between the input image and the sample normal image;

ceasing modification of the sample normal image based on a stopping criterion being met, wherein the stopping criteria is calculated based on a threshold decrease in the at least one difference between the input image and the sample normal image between consecutive iterations of the determining the at least one difference and the modifying the sample normal image; and identifying an abnormality in the input image, wherein the abnormality is indicated by an area of the input image that does not conform to a corresponding area of the sample normal image.

17. The non-transitory computer-readable medium as claimed in claim 16, wherein synthesis of the appearance model comprises applying principal component analysis jointly to both the texture model and the shape model.

\* \* \* \* \*

UNITED STATES PATENT AND TRADEMARK OFFICE
CERTIFICATE OF CORRECTION

| | | |
|---|---|---|
| PATENT NO. | : 8,831,301 B2 | Page 1 of 1 |
| APPLICATION NO. | : 12/567335 | |
| DATED | : September 9, 2014 | |
| INVENTOR(S) | : Singhal | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this
Twenty-second Day of September, 2015

Michelle K. Lee
*Director of the United States Patent and Trademark Office*